(12) United States Patent
Babin et al.

(10) Patent No.: US 7,554,652 B1
(45) Date of Patent: Jun. 30, 2009

(54) LIGHT-INTEGRATING RANGEFINDING DEVICE AND METHOD

(75) Inventors: François Babin, Québec (CA); Daniel Cantin, Québec (CA)

(73) Assignee: Institut National D'Optique, Quebec (CA)

( * ) Notice: Subject to any disclaimer, the term of this patent is extended or adjusted under 35 U.S.C. 154(b) by 0 days.

(21) Appl. No.: 12/040,008

(22) Filed: Feb. 29, 2008

(51) Int. Cl.
*G01C 3/08* (2006.01)
(52) U.S. Cl. ..................... 356/5.03; 356/5.01
(58) Field of Classification Search ........... 356/4.01, 356/5.01, 5.03
See application file for complete search history.

(56) References Cited

U.S. PATENT DOCUMENTS

| | | | |
|---|---|---|---|
| 3,661,459 A | | 5/1972 | Aoki |
| 3,723,002 A | | 3/1973 | Everest et al. |
| 4,259,592 A | | 3/1981 | Früngel et al. |
| 5,081,530 A | | 1/1992 | Medina |
| 5,262,837 A | * | 11/1993 | Shyy .................. 356/5.01 |
| 5,790,242 A | * | 8/1998 | Stern et al. ............ 356/4.04 |
| 6,100,517 A | | 8/2000 | Yahav et al. |
| 6,373,557 B1 | | 4/2002 | Mengel et al. |
| 6,384,903 B1 | * | 5/2002 | Fuller ................. 356/4.01 |
| 6,480,265 B2 | | 11/2002 | Maimon et al. |
| 7,009,690 B2 | | 3/2006 | Kamon et al. |
| 7,095,487 B2 | * | 8/2006 | Gonzalez-Banos et al. . 356/4.07 |

| | | |
|---|---|---|
| 2001/0024271 A1 | 9/2001 | Takayanagi et al. |
| 2002/0135749 A1 | 9/2002 | Maimon et al. |

FOREIGN PATENT DOCUMENTS

JP    2001-264439    9/2001

OTHER PUBLICATIONS

Medina et al, "Compact laser radar and three-dimensional camera" J. Opt. Soc. Amer. A, vol. 23, pp. 800-805, Apr. 2006.
Miyagawa et al, "CCD-based range-finding sensor" IEEE Trans. Electron. Devices, vol. 44, pp. 1648-1652, 1997.
Christie et al. "Design and development of a multi-detecting two-dimensional ranging sensor" Meas. Sci. Technol. vol. 6, pp. 1301-1308, 1995.

* cited by examiner

*Primary Examiner*—Isam Alsomiri
(74) *Attorney, Agent, or Firm*—Merchant & Gould P.C.

(57) ABSTRACT

A rangefinding device and a method for determining the range of an object from a rangefinding device are provided. A train of light pulses each having an emission time and a pulse duration is generated. The pulse duration is set to twice the round-trip time to a maximum range of the device. The light pulses are reflected back toward the device by the object and detected according to three time intervals, respectively determined by a background gate, a ranging gate and a pulse energy gate. The light energy received during each interval is integrated and the integrated light value corresponding to the ranging gate is normalized using the values from the other two intervals. The range of the object is determined from the normalized ranging measurement and calibration data.

19 Claims, 3 Drawing Sheets

LIGHT-INTEGRATING RANGEFINDING DEVICE AND METHOD

FIELD OF THE INVENTION

The present invention relates to the field of optical rangefinding and more particularly concerns a device and method for optically measuring the range of an object using time-integrated measurements.

BACKGROUND OF THE INVENTION

The determination of the distance, or range, of an object is relevant to a variety of applications. Efforts are constantly being made to improve the accuracy of rangefinding devices while maintaining manufacturing costs as low as possible.

It is known in the art to provide rangefinding devices which send a precisely timed light pulse toward an object and to make gated measurements of the light reflected thereby. The round-trip time of flight of the light pulse is simply related to the range of the object through the relation $R=V \times \Delta t_D/2$, where R is the range of the object, V stands for the velocity of light in the medium through which it propagates and $\Delta t_D$ is the time delay between the pulse emission and its detection.

Several rangefinding devices that include time-gated detection schemes are known in the art. For example, U.S. Pat. No. 5,081,530 (MEDINA) teaches a three dimensional camera including a rangefinder. The rangefinding application sends a light pulse toward a target and records the reflected light using two gated time intervals, one synchronized with the emission of the light pulse and the other starting at the end of the pulse. The range of the object is determined by the difference between the integrated energy in both pulses, normalized by the sum of these two energy values. More recently, MEDINA et al. reported in a paper entitled "Compact laser radar and three-dimensional camera" (J. Opt. Soc. Amer. A, Vol. 23, pp. 800-805, (2006)), a similar detection scheme combined with a scaling of a range register according to a calibrated factor.

Also known in the art is U.S. Pat. No. 7,095,487 (GONZALES-BANOS et al.). GONZALES-BANOS discloses systems and methods for determining depth using shuttered light pulses. A light emitter emits a pulse of light that is directed toward an object, where it is reflected toward a beam splitter. The beam splitter splits the reflected pulse into multiple pulses, with each pulse directed to a shuttered sensor with a different timing. The shuttered sensors measure the integrated intensity of the light, and these values are used to determine the depth of the object. A method is presented which calibrates a system that has an arbitrary number of shutters and enables the system to determine the depth of an object, even in the presence of ambient illumination and scattered light.

Other rangefinding systems and methods based on time-gated detection are for example taught in R. Miyagawa and T. Kanade, "CCD-based range-finding sensor", IEEE Trans. Electron. Devices, Vol. 44, pp. 1648-1652, (1997), in S. Christie et al., "Design and development of a multi-detecting two-dimensional ranging sensor", Meas. Sci. Technol. Vol. 6, pp. 1301-1308, (1995), and in U.S. Pat. Nos. 6,373,557 (MENGEL et al.) and 6,480,265 (MAIMON et al.).

There however remains a need in the field for a simple yet accurate rangefinding device which could be built using low-cost components.

SUMMARY OF THE INVENTION

In accordance with a first aspect of the present invention, there is provided a method for optically measuring a range R of an object from a rangefinding device. The method includes the following steps of:

a) emitting a train of light pulses from the rangefinding device toward the object for reflection thereby. Each of the light pulses has an emission time and a pulse duration corresponding to a round-trip time to a maximum range;

b) detecting light received by the rangefinding device during three time intervals of a same gate duration, this gate duration corresponding to twice the pulse duration. The time intervals are determined by:
  a background gate closing at the emission time of one of the light pulses;
  a ranging gate centered on the emission time of another one of the light pulses; and
  a pulse energy gate opening at the emission time of yet another one of the light pulses;

c) integrating light detected during each of the time intervals, thereby obtaining an integrated light value for each of the gates;

d) normalizing the integrated light value for the ranging gate using the integrated light value for the background and pulse energy gates, thereby obtaining a normalized ranging measurement; and e) determining the range R of the object from the normalized ranging measurement and calibration data.

In accordance with another aspect of the invention, there is also provided a rangefinding device for optically measuring a range R of an object therefrom.

The rangefinding device first includes an emitter module for emitting a train of light pulses toward the object for reflection thereby, each of the light pulses having an emission time and having a pulse duration corresponding to a round-trip time to a maximum range. The device further includes a receiver module for detecting light received thereby during three time intervals of a same gate duration. The gate duration corresponds to twice the pulse duration. The time intervals are determined by a background gate closing at the emission time of one of the light pulses, a ranging gate centered on the emission time of another one of the light pulses, and a pulse energy gate opening at the emission time of yet another one of the light pulses.

The rangefinding device further includes integrating means for integrating light detected during each of these time intervals, thereby obtaining an integrated light value for each of said gates. Normalizing means are also provided for normalizing the integrated light value for the ranging gate using the integrated light value for the background and pulse energy gates, thereby obtaining a normalized ranging measurement, from which the range R of the object is found through the use of calibration data.

Other features and advantages of the invention will be better understood upon reading of the description of preferred embodiments thereof with reference to the appended drawings.

DESCRIPTION OF PREFERRED EMBODIMENTS OF THE INVENTION

Figure 1:
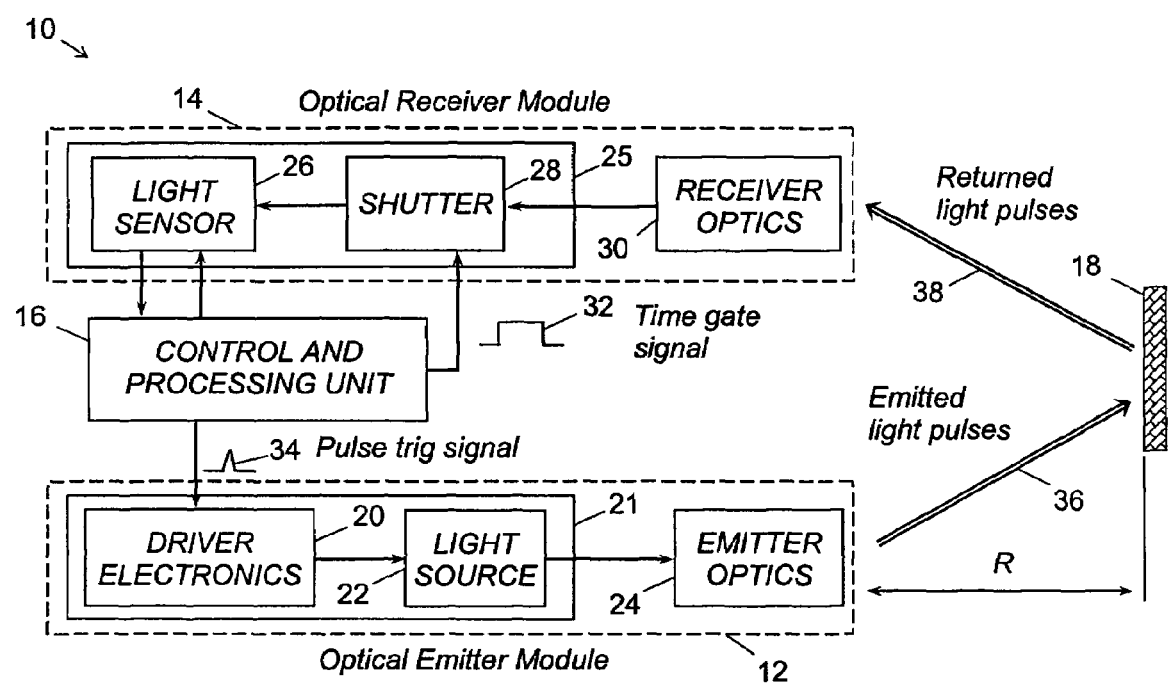
FIG. 1 is a schematic block diagram of a rangefinding device in accordance with an embodiment of the present invention.

Referring to FIG. 1, there is shown a rangefinding device 10 for optically measuring a range R or distance of an object therefrom, according to a preferred embodiment of the invention. Throughout the present description, the reference to an "object" is understood to encompass any target, body, surface or portion thereof that can reflect light and whose distance from the rangefinding device 10 is to be obtained. The object may be still or in movement, inasmuch as its distance from the rangefinding device does not vary significantly on the time scale of the required data acquisition. Applications of a rangefinding device according to embodiments of the present invention for example include, without being limited to, range-resolved imaging tasks of various types, detection means for integration in collision-avoidance and traffic control systems, video surveillance systems capable of providing range information for enhanced situational awareness, and low-cost optical rangefinder devices for consumer market. It will of course be clearly understood that the applications mentioned above are given by way of example only and are not considered in any way limitative to the scope of the invention. In addition, it will be understood that the meaning of the terms "light" or "optical" in the context of the present application is understood to refer to any appropriate portion of the electromagnetic spectrum and is not limited to visible light.

The rangefinding device 10 includes an optical emitter module 12 for emitting a train of light pulses 36, and an optical receiver module 14 for the capture of the light pulses 38 reflected back toward the device 10. The successive light pulse emissions are spaced from each other by a time period given by 1/F, where F is the pulse repetition rate of the emitter module 12, which is generally in the kHz range.

In use, the optical axis of the rangefinding device 10 is aimed so that the emitted light pulses 36 hit an exposed surface of the object 18 located at a distance R (to be measured) from the device 10. The exposed surface of the object 18 reflects a fraction of the incident light pulse energy within a solid angle that encloses the input aperture of receiver optics 30 of the optical receiver module 14.

The receiver module 14 detects light received thereby during three time intervals of a same gate duration corresponding to twice the pulse duration. As will be explained in more detail further below, these time intervals are determined by a background gate closing at the emission time of one of the light pulses, a ranging gate centered on the emission time of another one of the light pulses, and a pulse energy gate opening at the emission time of yet another one of the light pulses. Means are further provided for integrating light received during each of these time intervals, for normalizing the integrated light value for the ranging gate using the integrated light value for the background and pulse energy gates and for determining the range R of the object from the normalized ranging measurement and a table of calibration data. A control and processing unit 16 preferably embodies the normalizing and determining means, but different components could alternatively be provided for each function.

In accordance with a preferred embodiment of the present invention, the optical emitter module 12 preferably includes a light source assembly 21 for generating the train of light pulses, and emitter optics 24 for shaping the generated pulses to form a beam having the desired propagation characteristics. The light source assembly 21 preferably includes a light source 22 controlled by driver electronics 20. Upon reception of a pulse trig signal 34 from the control and processing unit 16, the driver electronics 20 generates an electrical current pulse that is routed to the light source 22 for emission of an optical pulse. The light source 22 is generally a laser, and preferably a semiconductor laser diode, but other types of optical sources can be envisioned without departing from the scope of the present invention. The choice of the light source to be integrated in the rangefinding device 10 depends on factors such as its capacity to be operated in repetitively-pulsed regime with peak optical output powers suitable for successful ranging at the desired maximum distance, the emission wavelength, the minimum pulse duration that can be achieved and the cost of the light source. Light sources such as fiber lasers, microchip lasers, solid-state lasers, and even light-emitting diodes (LEDs) find their way in rangefinder applications, particularly when the desired emission wavelength is not available from the laser diode sources that currently exist. Note that a light source operated in CW (continuous-wave) regime could be integrated in the optical emitter module 12 instead of using a light source 22 operated in repetitively-pulsed regime. In this alternative configuration the emitted light beam would be pulsed by its transmission through an optical modulator (not shown in FIG. 1) that would include proper drive electronics commanded by the pulse trig signal 34.

The optical pulses generated by the light source 22 pass through the emitter optics 24 before leaving the optical emitter module 12. The emitter optics 24 may be embodied by any appropriate optical component or assembly of optical components such as lenses or mirrors having suitable optical coatings to minimize reflection losses. Likewise, it may happen in some particular applications that the optical pulses would not require further conditioning when escaping from the light source 22, so that the emitter optics can either be avoided or it may consist simply of a flat protective optical window.

It will be appreciated that the light source assembly 21 may comprise more than a single light source 22 without departing from the scope of the present invention. For example, a set of light sources could be integrated in the optical emitter module wherein each of them radiates optical pulses along a specific direction. Such a multiple light source assembly is often combined with an optical receiver module 14 that provides a wide field of view, and it is well suited for applications that rule out the manual pointing of the rangefinding device 10 along a specific target to be ranged (e.g., in collision-avoidance systems).

The optical receiver module preferably includes a light detecting assembly 25 for detecting light according to the three time intervals mentioned above, and light receiving optics 30 for collecting light and then directing it onto the photosensitive surface area of the light detecting assembly 25. The emitter optics 24 and receiver optics 30 are generally boresighted to provide a suitable spatial overlap of the optical beam path with the field of view of the optical receiver module 14 over a predetermined range interval. The light detecting assembly 25 preferably includes a light sensor 26 and a shutter 28 controlling the exposure of the light sensor 26 to the received light. Preferably, the light sensor 26 enables time integration (or accumulation) of the optical power that falls onto its photosensitive surface during the three time intervals mentioned above, as controlled by opening and closing the shutter 28. In this case, the light sensor itself embodies the light integrating means. Preferably, the control and processing unit 16 generates gate signals 32 that command the opening and closing of the shutter 28. The gate signals 32 are precisely synchronized with the pulse trig signals 34 that command the emission of light pulses by the optical emitter module 12. The light sensor 26 is preferably embodied by a charge-coupled device (CCD) sensor or a complementary metal oxide semiconductor (CMOS) sensor, but other types of light-integrating sensor could be used without departing from the scope of the present invention. Alternatively, the light sensor 26 could be a conventional square-law detector like a PIN or avalanche (APD) photodiode. In this case, the integration would be performed either electronically or numerically on the electrical output signals generated by the photodiode, in which case the integrating means would be embodied by the control and processing unit 16 or by any other processing device. The light sensor 26 could be formed of a single photosensitive element (photoelement) for conventional rangefinding purposes, or of a plurality of such photoelements, each performing an individual ranging function. The multiple photoelements may form a one-dimensional linear array, or even a two-dimensional array for applications that require range-resolved imaging capabilities, such as in the so-called "3D cameras". The present invention encompasses light sensors 26 of these various types.

Large amounts of photoelectrons generated during the exposure of light-integrating sensing devices to light can be accumulated in each individual photoelement before being converted into a signal whose peak amplitude is indicative of the number of detected photoelectrons. Even though the light sensor 26 and the shutter 28 are depicted as two distinct block items in FIG. 1, the shuttering action could preferably be performed by the electronic shutter integrated in the structure of CCD and CMOS sensors. As will be explained in more detail below, the shutter 28 should preferably enable repetitive light exposure periods with durations of a few microseconds each, depending on the desired maximum range to be covered by the rangefinding device 10. The present invention can take advantage of the availability of low-cost CCD and CMOS light sensing devices in which the electronic shutter can be commanded independently of the charge transfer for readout, thus enabling the generation of a single image frame that integrates a large set of short-duration light exposures.

The light receiving optics 30 could include a single converging lens or mirror that focuses the collected optical power onto the light sensor 26 whose photosensitive surface lies at or close to the lens' focal plane. Of course, any other appropriate optical component or combination of optical components could alternatively be used. In some cases, the specific characteristics of the intended application or the design of the light detecting assembly 25 may obviate the use of receiver optics in the optical receiver module 14.

With reference to the timing diagram of FIG. 2, a method for optically measuring the range R of an object from a rangefinding device according to an embodiment of the present invention will be explained. The rangefinding device is preferably of the type described above or is embodied by an equivalent apparatus.

In accordance with a first step of this method, a train of light pulses 50 is emitted from the rangefinding device for reflection by the object. The temporal shape of an individual light pulse 50 is shown on diagram a) of FIG. 2. Each light pulse 50 has an emission time $t_0$ corresponding to the specific moment this light pulse 50 begins to exit from the optical emitter module 12. Each light pulse 50 also has a pulse duration T. An important aspect of the present invention is that the pulse duration T cannot be set arbitrarily, since it must be equal, or at least nearly equal, to the full round-trip time of light to an object 18 located at maximum range $R_{MAX}$ to be covered by the rangefinding device and method. For example, the pulse duration T must be set to about 6.7 μs if it is desired to range objects that are located at distances that do not exceed 1 km.

The next step of the method involves detecting light reflected back toward the rangefinding device by the object. Diagram b) of FIG. 2 shows the temporal shape of a returned light pulse as collected by the optical receiver module of the rangefinding device. Relative to the emission time $t_0$ of a given pulse, the arrival of the corresponding returned light pulse 52 is delayed by a time interval $\Delta t_D$ that increases in proportion to the distance R to the object. The finite velocity at which the light pulses propagate during their travel toward the object and then back to the receiver module causes this time delay. The measurement of the time delay $\Delta t_D$ allows for the determination of the distance R through the simple formula $R = V \times \Delta t_D / 2$, where V stands for the velocity of light in the medium in which the light pulses propagate. All of the range information is therefore contained within the time delay $\Delta t_D$. It will be obvious to a person skilled in the art that both profiles 50 and 52 are sketched using quite different vertical scales since the optical energy carried by the returned light pulse 52 is typically only a minute fraction of that of the emitted pulse 50. Furthermore, as will also be understood by one skilled in the art, emitted and received light pulses 50 and 52 are shown as having a "bell-like" temporal shape by way of example only which should not be considered as limitative to the scope of the present invention.

In contrast with conventional time-of-flight rangefinders in which the range R to the object is determined by directly measuring the time delay $\Delta t_D$ with a properly interrupted digital time counter or voltage ramp, the method of the present invention makes use of measurements for three time intervals, determined by appropriate gates. These measurements are labelled $M_1$, $M_2$ and $M_3$ in FIG. 2. All three time intervals have a same gate duration 2T, that is, the received light is always integrated during periods equal to twice the duration of each emitted light pulse 50. Each measurement then differs from the others only by the timing of its gate with respect to the reference time $t_0$.

Figure 2:
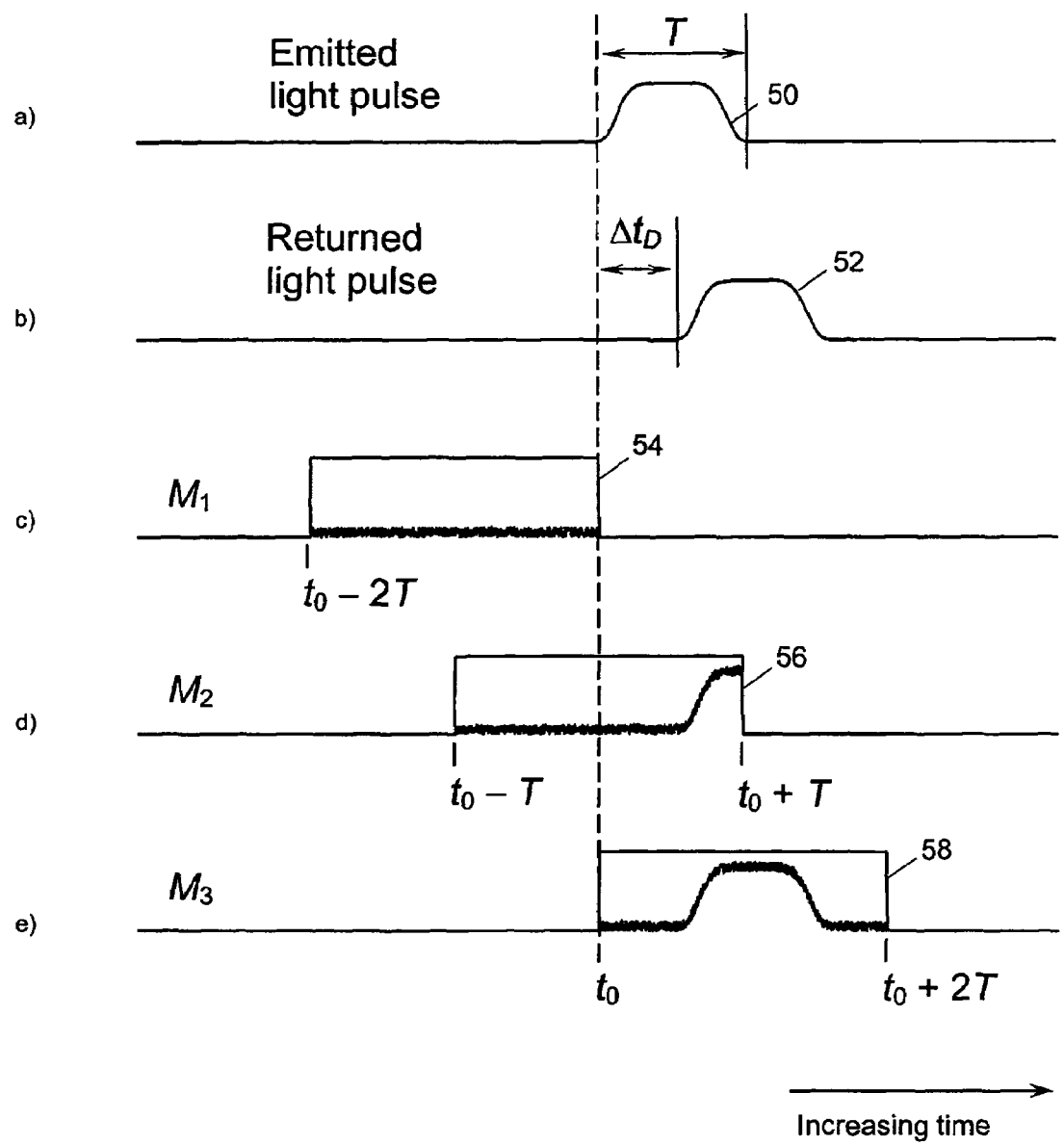
FIG. 2 is a diagram showing the timing of the background, ranging and pulse energy gates $M_1$, $M_2$, and $M_3$ relative to the emission of a light pulse and its subsequent reception by a rangefinding device.

The measurement in the first time interval, $M_1$, shown in diagram c) of FIG. 2, is determined by a background gate allowing light to be detected for a period of time that finishes at the moment $t_0$, which corresponds to the start of the rising edge of an emitted light pulse. As a consequence, only the parasitic background contribution is captured and accumulated during this gate. This background contribution has been made easily visible in the measurement $M_1$ depicted in FIG. 2, and it arises essentially from the ambient light collected by the light receiving optics in the rangefinding device of FIG. 1. Inserting in front of the light sensor a narrow bandpass optical filter centered on the emission wavelength would block a large part of this ambient light, but the finite optical bandwidth of the filter will always allow a certain amount of light to be transmitted. The purpose of the measurement $M_1$ is for carrying out a background correction on both subsequent measurements $M_2$ and $M_3$. The background correction is an important aspect of the present invention because the energy of the time-integrated background signal may be of the order of the returned pulse energy, particularly when attempting to range non-cooperative (weakly reflecting) objects in sunny daytime conditions.

The second measurement $M_2$ is determined by a ranging gate 56 shifted with respect to the background gate 54 by a time delay equal to the emitted pulse duration T, and therefore centered on the emission time $t_0$. In this way, the rising edge of a returned light pulse 52 would be detected by the light sensor during the second half of the time interval. The optical pulse energy $E_R$ enclosed within the ranging gate 56 is a function of the time of arrival $\Delta t_D$ of the rising edge of the returned light pulse 52, as it is clearly seen for the measurement $M_2$ depicted in FIG. 2. $E_R$ can be described by the following expression:

$$E_R = \int_{t_0}^{t_0+T} p(t - \Delta t_D) dt \quad (1)$$

where p(t) is the temporal profile of the returned light pulse, assuming that the pulse emission starts at $t_0$. In one extreme case, $E_R$ would be equal to the total optical pulse energy E if the object was in close proximity to the rangefinding device, since the whole returned pulse profile 52 would be enclosed within the gate 56. In the other extreme, no optical pulse energy would be recorded if the range R to the object was to exceed the maximum range $R_{MAX}$ dictated by the pulse duration T. The curve 56 in FIG. 2 then depicts an intermediate situation in which the measured energy $E_R$ within the ranging gate would be equal to nearly half of the total pulse energy E.

The value of the time delay $\Delta t_D$ of a returned light pulse 52 (and then the measured range R to the object) determined directly from the time-gated measurement $M_2$ would vary with the optical peak power of the returned light pulses 38 when impinging on the receiver optics 30. Obviously, this optical peak power depends on internal factors such as the optical peak power of the light pulses 36 at the exit of the emitter optics 24. Likewise, the optical peak power of the returned light pulses 38 depends on external factors relating to the optical extinction undergone by the light pulses during their atmospheric propagation to the object and to the reflectivity of the exposed surface of the object 18 at the emission wavelength. Performing a third time-gated measurement $M_3$ determined by a pulse-energy gate 58 that starts right at the reference time $t_0$, as shown in diagram e) of FIG. 2, allows for getting rid of the combined influence of the various factors mentioned above. A returned light pulse 52 will be fully enclosed within the gate 58 provided that the range R to the object does not exceed the maximum range $R_{MAX}$, recalling that the duration of this gate still equals 2T. $M_3$ is then a measurement of the total optical energy E of each returned light pulse 52:

$$E = \int_{t_0}^{t_0+2T} p(t - \Delta t_D) dt \quad (2)$$

and it serves to normalize the previous measurement $M_2$.

The method according to the current embodiment of the invention involves integrating the light received by the light sensor within each of the time intervals and obtaining the measurements $M_1$, $M_2$ and $M_3$. As mentioned above, the integration can be performed directly at the hardware level by using a light integrating sensor such as a CCD or CMOS sensor. Alternatively, the integration could be performed electronically or numerically subsequently to the detection, using an appropriate processor. In any event, an integrated light value is obtained for each time interval as determined by each of the background, ranging and pulse energy gates.

It will be noted that although FIG. 2 shows the three gates applied to a same light pulse, in practice the time integration over each gate will of course be performed over a different light pulse of the train of light pulses. It will be further noted that the three measurements need not be performed in any particular order, nor do they need to be performed on consecutive light pulses. As will be explained in detail further below, in one embodiment of the invention a set of measurements is taken for each gate, so that the integrated values obtained correspond to cumulated light relative to a plurality of light pulses.

In accordance with a next step of the method, the integrated light value for the ranging gate is normalized using the integrated light values for the background and pulse energy gates.

The schematic time representations of the measurements $M_2$ and $M_3$ in FIG. 2 show the parasitic background signal contribution that is superimposed on the pulse temporal profiles enclosed in gates 56 and 58. Subtracting the result of the previous measurement $M_1$ from the pulse energy measurements $M_2$ and $M_3$ described earlier would eliminate the effect of the background contribution. This very simple way of correcting the measurements is made possible by the fact that the three time-gated measurements $M_1$, $M_2$ and $M_3$ are performed with gates of the same duration. Normalizing the measurement $M_2$ after having subtracted the background contribution leads in a natural way to the following time-gated pulse energy ratio:

$$M_R = \frac{E_R}{E} = \frac{M_2 - M_1}{M_3 - M_1} \quad 0 \le M_R \le 1 \quad (3)$$

which corresponds to a normalized ranging measurement.

Figure 3:
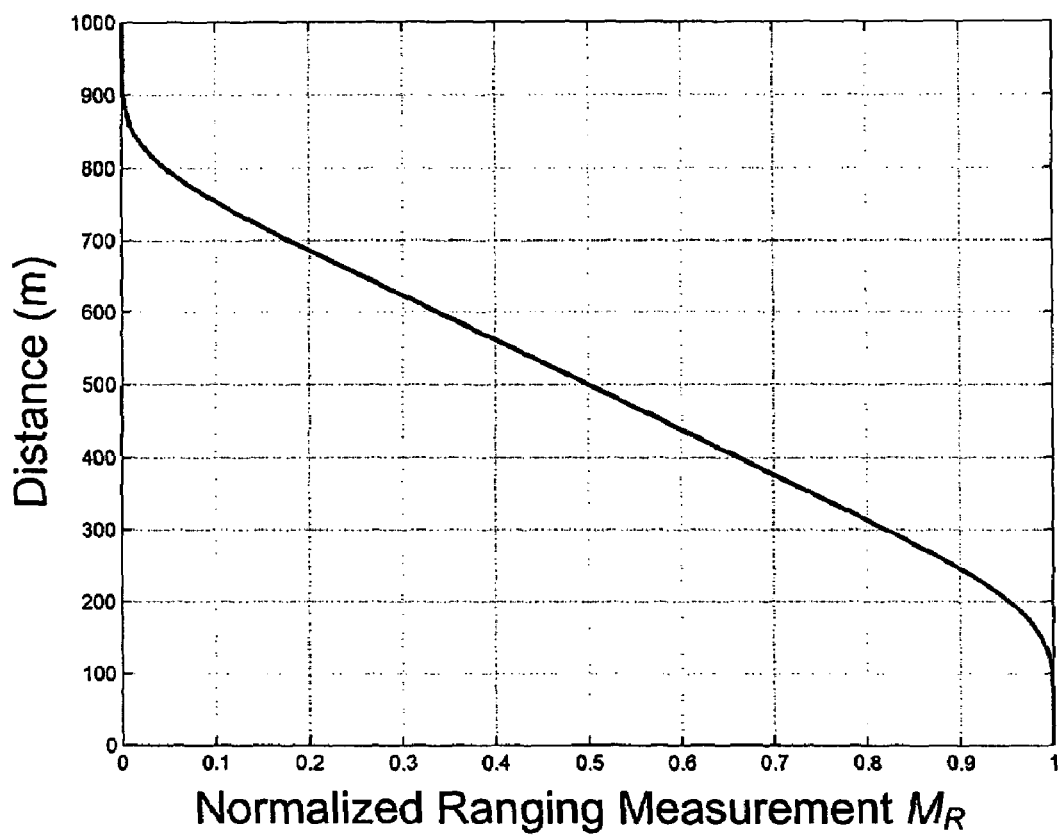
FIG. 3 is an example of a computer-generated calibration curve that relates the normalized ranging measurement to the distance R at which an object is located.

$M_R$ displays a monotonically decreasing trend when plotted as a function of the time delay $\Delta t_D$ of the returned light pulse 52. The range R to the object 18, which is directly related to the time delay $\Delta t_D$, can be obtained directly from the normalized ranging measurement via calibration data, such as a curve or a look-up table previously established by calibrating the rangefinding device. FIG. 3 shows an example of a calibration curve that was computed by using the specific temporal shape of the returned light pulse 52 shown in FIG. 2. The maximum range $R_{MAX}$=1000 m corresponds to the pulse duration T set to 6.7 µs for this example. The smooth appearance of this computer-generated calibration curve results from the smooth temporal profile of the pulse 52. The curvatures of the calibration curve at both limits of the interval depend on the specific shapes of the rising and falling edges of the pulse profile 52. In the limiting case of perfectly square-shaped light pulses, the calibration curve would be a straight line over the whole range or variation of the ratio $M_R$. The calibration curve can be stored in memory in the form of a look-up table that would be accessed by the processing unit for retrieval of the range value R from the input ratio $M_R$ computed from the time-gated energy measurements.

The exact shape of the calibration curve depends strongly upon the temporal shape of the returned light pulses 52. In turn, the returned light pulses 52 have, most of the time, an irregular temporal shape, so that fitting an analytical function to the curve would be unsatisfactory. It is therefore preferable, in practice, to assess the calibration curve from experimental measurements performed with the rangefinding device operated in nominal conditions. In fact, using a calibration curve determined experimentally would lead to more accurate range measurements, particularly when the temporal pulse shape is relatively stable from pulse to pulse. In addition, the calibration run would account for any hardware-generated time delay between the reception of a pulse trig signal by the driver electronics and the start of the emission of a light pulse. Finally, performing experimental calibration runs offers the further advantage of taking into account the real rise time and fall time of the gates, which result from the limited frequency response of the shutter.

In accordance with one embodiment of the invention, owing to the repetitively-pulsed regime of the optical emitter module 12, one could greatly benefit from the light integrating capability of the light sensor by integrating a large number N of consecutive returned light pulses 52 for each separate measurement $M_2$ and $M_3$. Accordingly, the measurement $M_1$ would consist of N consecutive integration periods of the light background. The number N would be limited essentially by the full well capacity of the photoelements of the light sensor, the potential wells being filled at the fastest rate during the measurement $M_3$. This important aspect of the present invention can be thought of as a pulse averaging process, which is an efficient but simple way for increasing the signal-to-noise ratio (SNR) of measurements. Moreover, in the present invention, the pulse averaging process is performed preferably at the hardware level, i.e., without having to perform repetitive numerical summations on digitized versions of the output signals from the light sensor. The photoelectrons accumulated in the photoelements need to be read out and converted into electrical signals only after having completed a set of N consecutive light exposures for each of the three measurements $M_1$, $M_2$, and $M_3$. The readout noise contribution in the light sensor is then kept at a minimum. The ratio $M_R$ would then be computed exactly the same way as previously described (see Eq. (3)), except that the individual values of the measurements $M_1$, $M_2$ and $M_3$ would be higher by a factor N as compared to their "single-pulse" counterparts. In practice, the number N of time-gated light exposures could be either user-selectable or set automatically by the processing means of the rangefinding device. Performing multiple light exposures is a simple way for increasing the dynamic range of the device by adapting its operating characteristics to the specific measurement conditions.

In addition to the SNR of the range measurements that would be improved according to the well-known $\sqrt{N}$ law for N independent measurements, performing multiple light exposures relaxes significantly the peak power requirement for the light pulses emitted by the optical emitter module. As a consequence, less powerful and cheaper light sources could be successfully used in a rangefinding device operating in accordance with the method of the present invention. Multiple light exposures would also reduce significantly the impact of any jitter in the timing of the ranging gate $M_2$. Finally, the time required to integrate sets of N returned light pulses does not adversely affect the response time of the rangefinding device because the optical emitter module can be easily operated at pulse repetition rates F of at least several tens of kHz.

In summary, the present invention provides simple and low-cost device and method for rangefinding applications. In some high-level optical rangefinders taught in the prior art, the range to the object is measured by locating the position of a pulse echo of very short duration present in a captured return signal. The captured return signal typically comprises hundreds or even thousands of data samples that have been digitized at a rate that must reach several tens of MHz to provide acceptable range resolution. When compared to those instruments, the implementation of the method of the present invention is far less demanding on the electronics and signal processing hardware. As shown in Eq. (3), the range to an object is determined from only three time-gated measurements, one of these measurements being carried out in absence of any returned light pulse. The pulse duration T required for ranging over distances of about 1 km is about three orders of magnitude longer than the typical pulse durations used in the rangefinders of the prior art. As a consequence, a rangefinding device according to the present invention can use simpler drive electronics while a broader range of light sources can be selected for integration in the optical emitter module. Accordingly, the time-gated measurements $M_1$, $M_2$ and $M_3$ can be performed with gate durations in the microsecond range, thus paving the way to the use of standard CCD/CMOS light sensing devices instead of relying solely on micro-channel plate (MCP) time-gated image intensifiers optically coupled to CCD cameras. This results in a dramatic simplification of the light detection hardware along with a much lower procurement cost.

Of course, numerous modifications could be made to the embodiments described above without departing from the scope of the present invention as defined in the appended claims.

The invention claimed is:

1. A method for optically measuring a range R of an object from a rangefinding device, comprising the steps of:
   a) emitting a train of light pulses from said rangefinding device toward said object for reflection thereby, each of said light pulses having an emission time and having a pulse duration corresponding to a round-trip time to a maximum range;
   b) detecting light received by said rangefinding device during three time intervals of a same gate duration, said gate duration corresponding to twice the pulse duration, said time intervals being determined by:
      a background gate closing at the emission time of one of said light pulses;
      a ranging gate centered on the emission time of another one of said light pulses; and
      a pulse energy gate opening at the emission time of yet another one of said light pulses;
   c) integrating light detected during each of said time intervals, thereby obtaining an integrated light value for each of said gates;
   d) normalizing the integrated light value for said ranging gate using the integrated light values for the background and pulse energy gates, thereby obtaining a normalized ranging measurement; and
   e) determining said range R of the object from said normalized ranging measurement and calibration data.

2. The method according to claim 1, wherein the integrating of step c) is performed optically during to detecting of step b).

3. The method according to claim 1, wherein the integrating of step c) is performed electronically or numerically after the detecting of step b).

4. The method according to claim 1, wherein the normalizing of step d) comprises performing the calculation:

$$M_R = \frac{M_2 - M_1}{M_3 - M_1}$$

where $M_R$ is the normalized ranging measurement value, $M_1$ is the integrated light value for the background gate, $M_2$ is the integrated light value for the ranging gate and $M_3$ is the integrated light value for the pulse energy gate.

5. The method of claim 1, wherein the detecting of step b) is performed for a plurality of said light pulses, the integrating of step c) cumulating light relative to said plurality of light pulses within each of said time intervals.

6. The method of claim 5, wherein the detecting of step b) comprises:
- detecting light received within the background gate for a number N of light pulses;
- detecting light received within the ranging gate for a number N of subsequent light pulses; and
- detecting light received within the pulse energy gate for a number N of subsequent light pulses.

7. A rangefinding device for optically measuring a range R of an object therefrom, comprising:
- an emitter module for emitting a train of light pulses toward said object for reflection thereby, each of said light pulses having an emission time and having a pulse duration corresponding to a round-trip time to a maximum range;
- a receiver module for detecting light received thereby during three time intervals of a same gate duration, said gate duration corresponding to twice the pulse duration, said time intervals being determined by a background gate closing at the emission time of one of said light pulses, a ranging gate centered on the emission time of another one of said light pulses, and a pulse energy gate opening at the emission time of yet another one of said light pulses;
- integrating means for integrating light detected during each of said time intervals, thereby obtaining an integrated light value for each of said gates;
- normalizing means for normalizing the integrated light value for said ranging gate using the integrated light values for the background and pulse energy gates, thereby obtaining a normalized ranging measurement; and
- determining means for determining said range R of the object from said normalized ranging measurement and calibration data.

8. The rangefinding device according to claim 7, wherein the emitter module comprises:
- a light source assembly comprising at least one light source for generating said train of light pulses; and
- emitter optics for shaping the train of light pulses from the at least one light source into at least one beam having desired optical characteristics.

9. The rangefinding device according to claim 7, wherein the receiver module comprises:
- a light detecting assembly for detecting light during said time intervals; and
- light receiving optics for directing light received at said receiver module onto the light detecting assembly.

10. The rangefinding device according to claim 9, wherein the light detecting assembly comprises a light sensor and a shutter controlling the exposure of the light sensor to the light received at said receiver module according to said time intervals.

11. The rangefinding device according to claim 10, wherein said light sensor comprises a single photosensitive element.

12. The rangefinding device according to claim 10, wherein said light sensor comprises a plurality of photosensitive elements forming a linear or two-dimensional array, each of said photosensitive elements performing an individual rangefinding function.

13. The rangefinding device according to claim 10, wherein the integrating means comprise a light integrating function of said light sensor.

14. The rangefinding device according to claim 13, comprising a processing unit in communication with the receiver module for receiving the integrated light value for each of said gates from said light sensor, the normalizing means and determining means being components of said processing unit.

15. The rangefinding device according to claim 7, comprising a processing unit in communication with the receiver module for receiving therefrom signals representative of the light detected thereby, the integrating means, normalizing means and determining means being components of said processing unit.

16. The rangefinding device according to claim 7, further comprising a control unit in communication with the emitter module and receiver module, said control unit generating control signals for controlling the emission of the light pulses and for controlling the detection of light during said time intervals.

17. The rangefinding device according to claim 7, wherein the normalizing means perform the calculation:

$$M_R = \frac{M_2 - M_1}{M_3 - M_1}$$

where $M_R$ is the normalized ranging value, $M_1$ is the integrated light value for the background gate, $M_2$ is the integrated light value for the ranging gate and $M_3$ is the integrated light value for the pulse energy gate.

18. The rangefinding device according to claim 7, wherein the receiver module detects light within each of said time intervals for a plurality of said light pulses, the integrating means cumulating the light detected within each of said time intervals.

19. The rangefinding device according to claim 18, wherein the receiver module is adapted to detect light received within the background gate for a number N of light pulses, detect light received within the ranging gate for a number N of subsequent light pulses, and detecting light received within the pulse energy gate for a number N of subsequent light pulses.

* * * * *